(No Model.)

J. LINDLE.
WATER COOLER AND REFRIGERATOR.

No. 320,484. Patented June 23, 1885.

WITNESSES
A. S. Paré
Fred. C. Weber

INVENTOR
Joseph Lindle,
By Banning & Banning,
Attorneys

UNITED STATES PATENT OFFICE.

JOSEPH LINDLE, OF CHICAGO, ILLINOIS.

WATER-COOLER AND REFRIGERATOR.

SPECIFICATION forming part of Letters Patent No. 320,484, dated June 23, 1885.

Application filed April 15, 1885. (No model.)

*To all whom it may concern:*

Be it known that I, JOSEPH LINDLE, a citizen of the United States, residing at Chicago, Illinois, have invented certain new and useful Improvements in Ice-Boxes and Refrigerators, of which the following is a specification.

The object of my invention is to make a water-cooler and refrigerator with the most economical use of space and with the largest amount of cooling-surface; and my invention consists in the features and details of construction hereinafter described.

Figure 1:
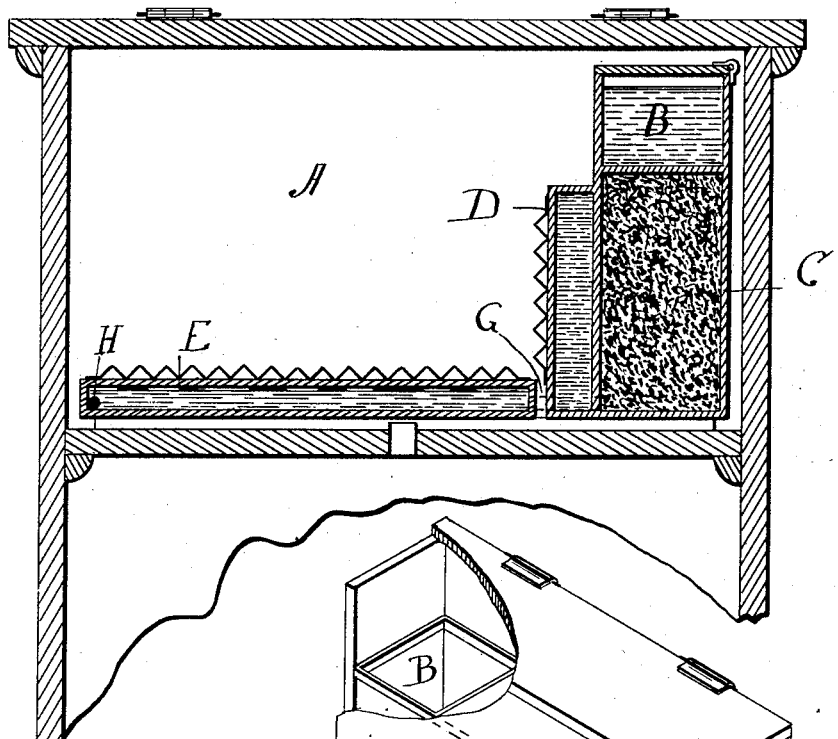
Figure 2:
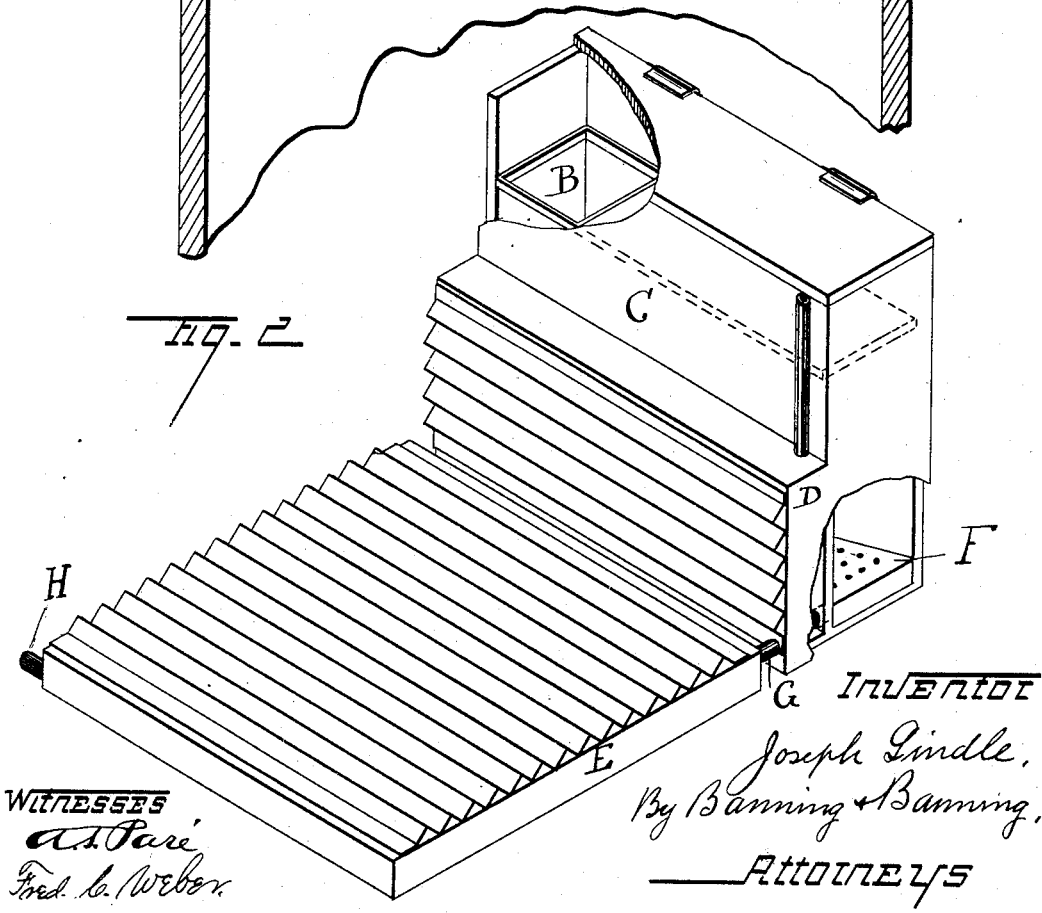

In the drawings, Figure 1 is a longitudinal section of the refrigerator or ice-box with the parts in place, and Fig. 2 is a perspective view of one end and the bottom of the same.

In the drawings, A represents the refrigerator; B, the water-tank; C, the filtering-chamber; D, a pure or filtered water-cooling chamber; E, another water-cooling chamber; F, a screen at one end of the filtering-chamber; G, a pipe leading from the filtered-water chamber to the other water-cooling chamber; and H, the pipe for drawing off the water.

In making my improved ice-box and water-cooler, I take any of the ordinary ice chests or refrigerators in common use, and at one end of it I place a chamber made of galvanized iron or other non-corrosive metal, and preferably of about the same width and height as the interior of the ice-chest. I fill the lower part of this chamber, which, for convenience, may be divided into an upper and lower apartment, as shown in Fig. 1, with any proper and suitable filtering material—such as charcoal—and pack it to the required density. In the upper part of this chamber is contained a water-tank, open at the bottom so that the water will freely pass from it upon and into the filtering material. To secure thorough filtration of the water, I deem it best to place this water-tank at one corner, as shown in Fig. 2, so that the water will have to pass down sidewise through the filtering material before it reaches the place provided for its escape. At the opposite lower corner of the filtering-chamber I place a screen, F, in an inclined position, to protect the opening leading from the filtering-chamber to the filtered-water chamber from particles of charcoal and other matters passing through with the filtered water. Immediately in front of the filtering-chamber I have provided a filtered-water-cooling chamber, which extends preferably across the box, so as to present as much surface to contact with the ice as possible. By making this filtered-water chamber broad and high, it may be made very thin, so as to occupy but little space, as shown in Fig. 1. Over the bottom of the ice-box I place a broad, thin chamber, which has a communication with the filtered-water chamber by means of the pipe G. By making this chamber broad, so as to practically cover the whole bottom of the ice-chest, it may be made thin, and yet hold a sufficient amount of water and present a large area of surface to contact with the ice. In front of the filtered-water chamber, and over the bottom of the ice-chest, I place, preferably, a corrugated metal lining, to preserve the water-chambers from being injured by heavy pieces of ice falling against them.

In operation, the water is introduced into the tank B from the top. It gradually filters down through the filtering-chamber until it reaches the bottom, when it passes through an opening into the filtered-water chamber D, and on into the flat chamber in the bottom of the ice chest. As this chamber E becomes filled, the water will rise in chamber D until it has reached the top. As the water is drawn off by pipe H for use, the water in the filtering-chamber will move forward and preserve the supply.

By this arrangement of parts I am enabled to make the most economical use of space, and by presenting a broad surface to contact with the ice I am able to secure as great cooling capacity as possible. In these respects I have found my present invention a very decided improvement over the arrangement shown and described in an application which I now have pending, No. 132,335, filed the 26th day of March, 1884.

What I consider as new, and desire to secure by Letters Patent, is—

1. An ice-chest or refrigerator provided with a water-tank and filtering-chamber at one end, a water-cooling chamber in front of the filtering-chamber, and a water-cooling chamber on the bottom of the ice-chest, substantially as described.

2. An ice-chest or refrigerator provided with a water-tank and filtering-chamber at one end, a broad, flat, thin water-cooling chamber in front of the filtering-chamber, and a broad, flat, thin water-cooling chamber on the bottom of the ice-chest, substantially as described.

JOSEPH LINDLE.

Witnesses:
E. F. HUBBARD,
THOMAS A. BANNING.